No. 672,747. Patented Apr. 23, 1901.
E. T. WHEELER.
SPOKE FASTENING.
(Application filed Sept. 22, 1900.)
(No Model.)
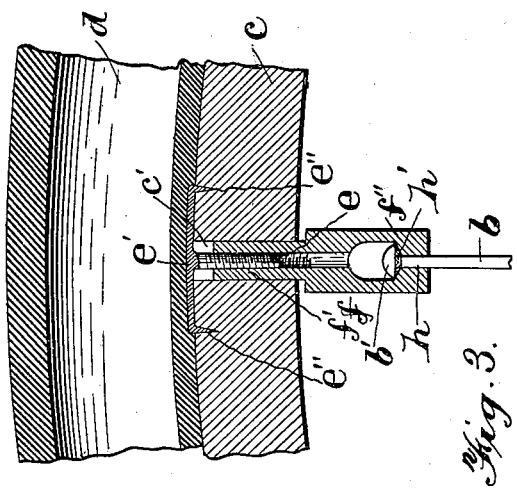
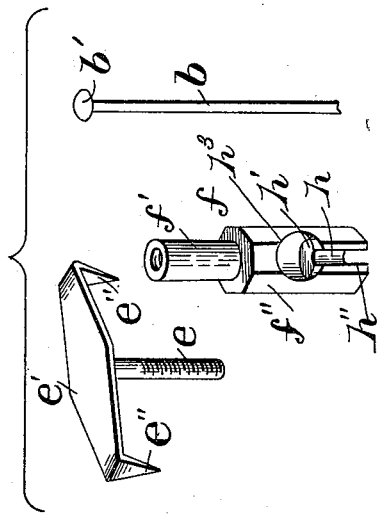
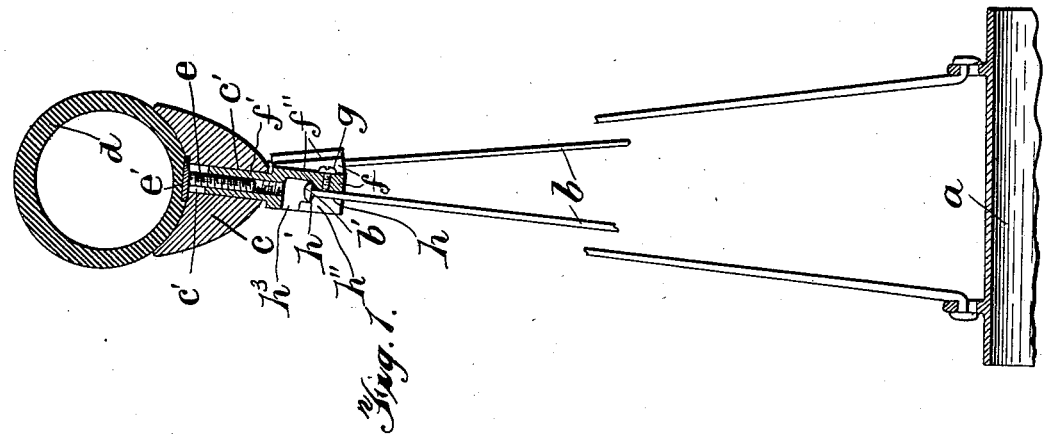
Witnesses
Geo. E. Frech.
Emily R. Peck.
Inventor
E. T. Wheeler
By Hubert E. Peck
Attorney
THE NORRIS PETERS CO., PHOTO-LITHO., WASHINGTON, D. C.

UNITED STATES PATENT OFFICE.

EDWARD THOMAS WHEELER, OF AKRON, OHIO.

SPOKE-FASTENING.

SPECIFICATION forming part of Letters Patent No. 672,747, dated April 23, 1901.

Application filed September 22, 1900. Serial No. 30,778. (No model.)

*To all whom it may concern:*

Be it known that I, EDWARD THOMAS WHEELER, a citizen of the United States, residing at Akron, Summit county, State of Ohio, have invented certain new and useful Improvements in Spoke-Fastenings; and I do hereby declare the following to be a full, clear, and exact description of the invention, such as will enable others skilled in the art to which it appertains to make and use the same.

This invention relates to certain improvements in wheels, and more particularly to improved spoke-fastening devices; and the objects and nature of my invention will be readily understood by those skilled in the art from the following explanation in the light of the construction shown in the accompanying drawings as an example from among various constructions within the spirit and scope of my invention.

My invention consists in certain novel features in construction and in combinations and in arrangement of parts, as more fully and particularly pointed out and specified hereinafter.

Referring to the accompanying drawings, Figure 1 is a sectional view through part of a wheel, showing part of the rim and hub and spokes fastened in accordance with my invention. Fig. 2 is an enlarged section through the rim and spoke-fastening, taken in a plane longitudinally of the rim and at right angles to the plane of the section of Fig. 1. Fig. 3 is a detail perspective view of the screw, nipple, and part of the spoke, said elements being shown separated one from the other.

In the drawings, $a$ is the wheel-hub, constructed in any suitable manner. As a matter of convenience I show the usual hub with perforated flanges to receive the spokes. The spokes $b$ are passed or threaded through the perforations of said flanges. Each spoke has its inner end bent laterally, with a head upset on the end thereof, as usual, so that the spoke extends radially to the rim, while said bent end extends laterally through a hub-flange and is held in place by the end head, which is larger in diameter than the flange-perforation receiving the spoke. The outer or opposite end of the spoke is straight and smooth—that is, it is not necessary to provide the outer end of the spoke with the usual exterior screw-thread. Said outer end of the spoke is upset or otherwise formed with a head $b'$, smaller in diameter than the head at the opposite end of the spoke, so that the spoke can be threaded through its perforation in a hub-flange. This head $b'$ is preferably beveled or tapered at its inner face around the spoke, substantially as shown in the drawings.

$c$ is the wheel-rim, of any suitable and desirable construction, although I show the ordinary form of wooden rim circumferentially concaved to receive the pneumatic tire $d$ or any other form of tire. The rim is pierced for each spoke by a radial cylindrical hole or opening $c'$ completely through the central portion thereof. These openings $c'$ are spaced in the rim according to the number and arrangement of the spokes. Spoke fastening and adjusting devices are provided at each opening $c'$ to fasten the spoke corresponding to such opening. The devices are alike, and hence the description of one will apply to all. Each fastening consists of a screw or externally-threaded bolt $e$, normally held fixedly in an opening $c'$, and a nipple $f$, held by and longitudinally adjustable on the screw and detachably and loosely receiving the spoke end. The screw or bolt $e$ is straight and preferably externally threaded throughout its length, and its diameter is sufficiently less than the internal diameter of the opening $c'$ to receive the nipple and permit turning of the same in said opening in the bolt. The bolt is fixedly held to the rim against rotation by suitable means. For instance, I show the bolt provided with the rigid flat elongated head $e'$, resting longitudinally on the floor of the concave of the rim and preferably formed with downturned end spurs or points $e''$, entering the wood of the rim about as shown, and thus holding the bolt against movement and in its proper place, while the flat head resting close to the floor of the concave of the rim and under the tire does not cause wear of the tire and avoids all danger of puncturing the tire. The bolt can be easily applied to the rim and, if necessary, (for which I see no present necessity,) can be easily removed on the removal or rolling back of the tire. However, the bolt is supposed to remain when once fixed to the rim, as the spoke and nipple can be removed without disturbing the position of the bolt.

The elongated nipple $f$ has the external smooth or cylindrical portion $f'$, which fits and turns in the rim-opening, and the remaining exterior portion $f''$ of the length of the nipple located inwardly beyond the rim is formed angular or otherwise to receive the proper instrument, whereby the nipple is rotated on the screw to tighten or loosen the spoke. The inner portion of the nipple has the longitudinal threaded bore or opening receiving and meshing with the threads of the bolt or screw fixedly mounted in the rim. The threaded portion of the nipple is of sufficient length to permit the necessary longitudinal range of movement of the nipple to accomplish the purpose intended.

If desired, a small radial hole can be tapped in the nipple to receive a small set-screw $g$ for the purpose of locking the nipple to the bolt, and thus preventing loosening or accidental rotation. However, I do not wish to limit my invention in this respect, although, as I am at present advised, advantages are attained by thus locking the parts through the medium of the set-screw clamping the spoke in the nipple, and thus preventing independent turning of the nipple, and consequently preventing turning of the nipple on the screw as the spoke is held against rotation.

The inner portion of the nipple has a longitudinal smooth or non-threaded bore $h$ opening through the inner end thereof and of the proper dimensions to receive the spoke snugly and permit rotation of the nipple on and independently of the spoke. The inner end of this bore $h$ is enlarged (see $h'$) and countersunk to receive the head of the spoke, so that the spoke and its said outer end head are concentric with the longitudinal axis of the nipple.

The spoke is rendered removable from the nipple and without necessitating removal of either the nipple or bolt by a longitudinal slot $h''$, extending radially through the nipple into the bore $h$ thereof and enlarged at its inner end at $h^3$ for the passage of the head of the spoke. The slot and its enlarged inner end are so arranged with respect to the bore $h$ and enlarged countersunk portion $h'$ that the spoke can be moved laterally through the slot and into the bore with its head in said enlarged portion $h'$, and when the nipple is screwed up on the bolt to tighten the spoke the head of the spoke will enter the said countersunk portion and rest out of alinement with the enlarged end $h^3$ of the slot. The spoke will thus be held in the nipple against lateral displacement or removal therefrom.

When it is desired to remove a spoke, it is only necessary to unscrew the nipple until the spoke is loosened and the countersunk portion of the nipple has moved outwardly away from the spoke-head and into line with the enlarged portion $h^3$ of the slot. The spoke can then be moved laterally from the nipple through said slot and unthreaded from the hub-flange, the small outer head of the spoke passing through the flange-perforation.

The simplicity and durability of my fastening and the fact that it can be easily applied to a wheel and that it permits removal and application of spokes without disturbing the tire are obvious.

The device of my invention can be applied to many forms of wheels adapted for many purposes, such as bicycles, automobiles, and other vehicles.

It is evident that various changes and modifications can be resorted to in the forms, arrangements, and constructions of the parts described without departing from the spirit and scope of my invention. Hence I do not wish to limit myself to the exact construction described.

Having thus fully described my invention, what I claim as new, and desire to secure by Letters Patent of the United States, is—

1. In a spoke-fastening, the combination of a screw-bolt adapted to be fixedly attached to a wheel-rim, a nipple screwing longitudinally on and having the longitudinal threaded bore receiving said bolt and having a longitudinal bore for the spoke with an enlarged inner end for the spoke-head, and a longitudinal slot extending radially into said bore for the lateral insertion and removal of the spoke, and a spoke having an outer end head, substantially as described.

2. In combination, a wheel-hub having means for attaching the spokes, spokes having outer end heads, a rim having radial openings, and spoke-fastenings between the spokes and rim comprising a screw in a rim-opening having an outer end head fixed to the rim and a nipple turning in said opening and having a longitudinal threaded bore receiving and turnable longitudinally on said screw, and an inner longitudinal bore with an enlarged inner portion to receive a spoke end and its head, said nipple formed with a radial slot to permit lateral removal and insertion of said spoke end and its head, substantially as described.

3. In a spoke-fastening, the combination of a screw having a rigid flat elongated head with spurs adapted to enter the floor of a rim-concavity with the head resting thereon and the screw in a rim-opening, a nipple screwing longitudinally on the screw and having a longitudinal bore to receive a head spoke end with an enlarged countersunk inner end for the spoke-head, and a longitudinal slot with an enlarged inner end opening radially into said bore and its enlarged inner end, substantially as described.

4. A spoke-fastening comprising a spoke having an outer end head, an adjustable nipple having a longitudinally-screw-threaded shank adapted to enter and turn in the rim-aperture, a longitudinally-screw-threaded member fixed longitudinally in said aperture and receiving said screw-threaded portion of said nipple, the outer end portion of said nipple having a longitudinal bore with an enlarged countersunk inner end to receive said spoke and head and a lateral slot through the nipple from said bore and enlarged portion to permit lateral insertion and removal of the spoke from the nipple without removing the nipple from the rim, substantially as described.

5. A device of the character described, consisting essentially of a spoke having an outer end head, a bolt having a head adapted to secure the bolt to the rim against rotation and longitudinally in a rim-aperture, an adjustable nipple having its inner portion formed to fit in the rim-aperture and provided with a longitudinal threaded bore screwing longitudinally on said bolt, the outer portion of said nipple formed with the longitudinal bore to receive said spoke and the enlarged inner end to receive the head of the spoke and with the radial slot formed to permit lateral insertion and removal of the spoke and its head to and from said bore and its enlargement, substantially as described.

6. A device of the character described comprising a threaded bolt provided with means to secure it to a rim longitudinally within an aperture thereof, a spoke having an end head, a nipple formed to screw longitudinally on said bolt and having a longitudinal bore with an end countersunk to receive the spoke and its head and formed with the lateral slot to permit lateral insertion and removal of the spoke from said nipple, and a radial set-screw in the nipple adapted to engage the spoke and lock the same and the nipple together substantially as described.

In testimony whereof I affix my signature in presence of two witnesses.

EDWARD THOMAS WHEELER.

Witnesses:
HENRY MUELHER,
H. M. HAGELBARGER.